United States Patent Office 2,732,387
Patented Jan. 24, 1956

2,732,387

METHOD OF MAKING MONOGLYCERIDES OR THE LIKE

George Y. Brokaw and Milton I. Van Graafeiland, Rochester, N. Y., assignors to Eastman Kodak Company, Rochester, N. Y., a corporation of New Jersey No Drawing. Application December 8, 1951, Serial No. 260,774

11 Claims. (Cl. 260—410.7)

This invention relates to methods of making monoglycerides or similar monoesters.

Fatty acid monoesters of polyhydric alcohols are commonly prepared by reacting a fatty material such as a fat, fatty oil or fat-forming fatty acid, with a suitable polyhydric alcohol in the presence of an ester-interchange catalyst, such as the acidic esterification catalysts or the basic alcoholysis catalysts, and thereby forming a reaction product containing a substantial proportion of monoester usually in admixture with diester and triester.

The yield of monoester in conventional processes usually ranges from about 35% by weight to about 60% by weight. The reaction product can thereafter be sold commercially for its monoester content or the monoester can be further concentrated or purified by vacuum distillation or other suitable procedure to give a high potency product containing 85% or more of monoester. In either case, it is desirable to obtain a higher yield of monoester in the original reaction product.

Furthermore it is desirable from the economic standpoint to employ as much of the reactor capacity as possible for the reactants, i. e. the fatty material and the polyhydric alcohol, since it is the reaction product of these two materials which is the valuable product. Use of excessive amounts of other materials in the reaction mixture necessitates the use of large volume reactors and also necessitates extensive separating facilities to separate out such extraneous material.

In the preparation of monoesters, acidic esterification catalysts can be employed at temperatures as low as 100°–150° C. but cannot be readily employed at high temperatures such as 170°–280° C. because of the danger of discoloration of product. Basic metal soap catalysts on the other hand are effective in the range above 170° C. and particularly above 180° C. with ordinary reactants, such basic catalysts being effective at lower temperatures only with anhydrous reactants. Since glycerine or a similar polyhydric alcohol normally contains water, treatment to bring it to an anhydrous condition is necessary if lowered temperatures are to be employed.

It is accordingly an object of this invention to provide an improved process for making monoesters.

It is another object of the invention to improve the production of monoesters by introduction into the reaction mixture of material promoting the course of the alcoholysis without increasing the volume of the reaction mixture to an objectionable degree.

Another object of the invention is to provide a process for making monoesters without the disadvantages attendant to low temperature processes.

Another object of the invention is to provide a process for making monoglycerides wherein the desirable basic alcoholysis catalysts can be employed but with improved yields over the normal processes employing such catalysts.

Another object of the invention is to provide a new monoester process employing small amounts of dioxane to facilitate the course of the process.

Another object of the invention is to provide a process for making monoesters wherein relatively large amounts of monoesters are formed in the process and relatively small amounts of other materials must be separated from the reaction product.

Other objects will be apparent from the description and claims which follow.

These and other objects are attained by means of this invention as described more fully hereinafter with particular reference to certain preferred embodiments thereof.

As in conventional processes for making monoesters, this invention can be applied in reacting any of the well-known fatty materials, including fats, fatty oils and fat-forming fatty acids, with any of the commonly employed polyhydric alcohols. Thus, the fatty materials which are suitable include fatty acids such as stearic acid, oleic acid, palmitic acid, lauric acid and the like; solid fats such as lard, tallow, hydrogenated lard and similar animal fats; fatty oils such as cottonseed oil, soybean oil, coconut oil, peanut oil or similar vegetable oils, whether hydrogenated or not; and similar well-known fatty materials. The animal fats, vegetable oils and similar materials consisting predominantly of triglycerides are of particular utility in practicing the invention.

Similarly any of the well-known polyhydric alcohols can be employed in practicing the invention. Glycerine is preferably employed whereby the desirable monoglycerides are formed, but other polyhydric alcohols such as sorbitol, mannitol, polyethylene glycols and the like can be used if desired.

We have discovered that monoesters are formed in excellent yield and without objectionable discoloration by reacting a suitable fatty material with the desired polyhydric alcohol in a reaction mixture containing dioxane in an amount not greater than the combined weight of the fatty material and the polyhydric alcohol, together with a basic metal soap alcoholysis catalyst, the reacting being effected at a temperature of at least 170° C. and at a pressure effective to prevent substantial vaporization of the dioxane from the reaction mixture at such temperature.

In practicing this invention, the basic metal soap alcoholysis catalysts are employed in the reaction mixture, such catalysts being the alkali metal soaps or alkaline earth metal soaps usually formed in situ by the addition to the reaction mixture of an alkali metal hydroxide or oxide or an alkaline earth metal hydroxide or oxide as typified by sodium hydroxide, potassium hydroxide, strontium hydroxide, barium hydroxide, strontium oxide, calcium oxide or similar well-known basic metal oxides or hydroxides. Such basic metal soap catalysts are effective to catalyze the alcoholysis reaction at temperatures above 170° C. and desirably above 180° C., with temperatures in excess of 200° C. and as high as 250°–280° C. or more being preferred.

We have discovered that the alcoholysis reaction at such temperatures is further promoted by the use of dioxane in the reaction mixture provided the reaction mixture is maintained under sufficient pressure to keep a substantial proportion of the dioxane in the reaction mixture in liquid form at the temperature employed. We have further discovered that under such conditions, amounts of dioxane not greater than the combined weight of the reactants give greatly improved yields of monoester, with amounts as low as 5% by weight being suitable and amounts of from 5% to 50% by weight being preferably employed. Thus by means of this invention, the reaction is promoted without undue dilution of the reaction mixture and the dioxane can be separated from the reaction product without need for extensive separating facilities.

The alcoholysis reaction proceeds in optimum yield when employing an excess of the polyhydric alcohol over calculated molar proportions. Thus the polyhydric alcohol is desirably employed in the ratio of at least 1½ and preferably 2 or more molar proportions of alcohol to each molar proportion of fatty material calculated as fatty acid. In the processes embodying this invention, commercial grade glycerine or other polyhydric alcohol containing minor amounts of water can be successfully employed, thereby avoiding expensive pretreatment to dehydrate the glycerine.

Following the alcoholysis reaction, the dioxane and the unreacted alcohol are separated from the reaction product. The separation of the dioxane can be effected in accordance with any well-known separation process such as distillation or the like, but the separation is readily effected by reducing the pressure on the reaction mixture to atmospheric pressure following the reaction and while the temperature is still above 170° C. whereby the dioxane is flash evaporated from the reaction product and the vapors drawn out of the reactor and condensed. Since the boiling point of dioxane at atmospheric pressure is about 101° C., the flashing off of substantially all of the dioxane from the reaction occurs readily, particularly with the relatively small amounts of dioxane employed in accordance with this invention. In the preferred process, the reaction product is then rapidly cooled to a temperature of 150° C. or lower and most of the glycerine or other polyhydric alcohol is separated out by phase decantation. If desired the catalyst can be inactivated prior to or subsequent to the separation of the glycerine and dioxane. In the preferred procedure, however, the monoester is further concentrated by vacuum distillation at a pressure below 100 microns Hg with the catalyst still in active form after which the catalyst, unreacted glycerine, dioxane and di- or triglycerides are recycled for further conversion.

The pressure employed during the reaction will, of course, depend upon the reaction temperature. The pressure may be as high as 180 p. s. i. at temperatures of about 250° C. A simple method of providing proper pressure conditions is to carry out the alcoholysis in a closed reactor with a slight excess of dioxane over the amount desired in the reaction mixture whereby dioxane vapors evolved upon heating exert the required pressure in the reactor to keep a major proportion of the dioxane in the reaction mixture in liquid form. The reaction time can be varied in accordance with usual practice, times of 15–120 minutes usually being preferred for optimum results.

We have also discovered that particularly good results are obtained by a series process wherein the fatty material and glycerine are first reacted in the conventional manner at atmospheric pressure and without dioxane whereby the alcoholysis is initiated and water is removed, and the resulting reaction mixture is then mixed with the desired amount of dioxane and additional glycerine and charged to a pressure reactor wherein the alcoholysis is completed. By employing a series process of this kind, water is removed in the initial step and the acid content of the product is reduced in the alcoholysis using dioxane whereas in a single step pressure process, the water remains in the reaction mixture and interferes somewhat with esterification of the free acids.

The invention is illustrated by the following examples of certain specific embodiments thereof, it being understood that the examples are included only for purposes of illustration and are not intended to limit the scope of the invention, except as otherwise specifically indicated.

*Example 1*

Cottonseed oil and a 200% excess over molar proportions of glycerine were charged into a pressure reactor. To this mixture were added dioxane in an amount of 30% by weight based on the combined weight of oil and glycerine, and 0.1% by weight of strontium hydroxide based on the weight of oil. The mixture was then heated to 250° C. for 60 minutes with the pressure in the reactor maintained at 130–140 p. s. i. during the reacting. The dioxane was then flashed off, the reaction product rapidly cooled below 100° C. and the glycerine separated out. The resulting reaction product assayed 70.0% cottonseed oil monoglycerides having satisfactory color.

*Example 2*

A mixture of cottonseed oil, glycerine amounting to a 400% excess over molar proportions, 30% by weight of dioxane based on the combined weight of glycerine and oil and about 0.6% by weight of metal soap catalyst was heated at 250° C. for 60 minutes with a pressure of about 140 p. s. i. in the reactor. The reaction product after separation of the dioxane and unreacted glycerine assayed 71.4% monoester.

*Example 3*

A 400% excess of glycerine was reacted with cottonseed oil in a reaction mixture containing 40% by weight of dioxane based on the combined weight of glycerine and oil and 0.1% by weight of strontium hydroxide hydrate. The reaction was effected at a temperature of 250° C. and a pressure of 170 p. s. i. for 60 minutes. The reaction product after removal of dioxane and glycerine contained 77.5% monoglycerides.

*Example 4*

A reaction mixture corresponding to that used in the preceding example was heated for 60 minutes at 260° C. with a pressure of 140 p. s. i. The reaction product contained 78.3% monoglycerides.

*Example 5*

A 400% excess of glycerine was heated with cottonseed oil and 50% dioxane based on the combined weight of glycerine and oil and with the usual metal soap catalysis, the alcoholysis being effected at 250° C. for 60 minutes with a reactor pressure of 170 p. s. i. The monoester content of the reaction product was 79.6%.

*Example 6*

A reaction mixture containing cottonseed oil, 600% excess of glycerine based on the molar proportions of oil, 40% by weight of dioxane based on the total weight of glycerine and oil, and 0.3% by weight of strontium hydroxide was heated at 250° C. for 60 minutes with a pressure in the reactor of 140 p. s. i. The reaction product contained 80.1% monoglyceride.

*Example 7*

The process employed in the preceding example was repeated with a reaction time of 120 minutes. The monoester content of the reaction product was 78.2%.

*Example 8*

The process of Example 6 was again repeated using a 120 minute reaction time and a dioxane content of 50% by weight based on the total weight of glycerine and oil. The monoester content of the reaction product was 74.1%, a slight decrease from optimum conditions.

High potency monoesters of good color are thus readily prepared in accordance with this invention by use of particular catalysts at high temperatures and using relatively small amounts of dioxane whereby a maximum amount of reactor capacity is taken up by the reactants and the removal and recovery of dioxane is facilitated. The invention also provides a process of making monoesters in high yield using commercial grade glycerine without the necessity for dehydration.

Although the invention has been described in considerable detail with reference to certain preferred embodiments, it will be understood that other fatty materials, other polyhydric alcohols and other basic metal soap catalysts can be employed and that the conditions of reaction can be varied or modified within the spirit and scope of the invention as described hereinabove and as defined in the appended claims.

We claim:

1. The method which comprises reacting a fatty material with an excess fo a polyhydric alcohol in a reaction mixture with dioxane and a basic metal soap catalyst, said dioxane amounting to at least 5% by weight but less than the combined weight of said fatty material and said alcohol, said reacting being effected at a temperature of at least 170° C. and at a pressure sufficient to maintain a substantial proportion of said dioxane in liquid form at the reaction temperature.

2. The method which comprises reacting triglyceride with an excess of glycerine in a reaction mixture including dioxane and a basic metal soap catalyst, the weight of said dioxane being at least 5% of but less than the combined weight of said triglyceride and said glycerine, said reacting being effected at a temperature of at least 170° C. and at a pressure sufficient to maintain a substantial proportion of said dioxane in liquid form at the reaction temperature.

3. The method which comprises heating a mixture of one molar proportion of a fatty material consisting predominantly of triglyceride, substantially more than one molar proportion of glycerine, dioxane in an amount of from 5% to 100% of the combined weight of said fatty material and said glycerine, and a basic metal soap catalyst, at a temperature of at least 170° C., and, during said heating, maintaining said mixture under pressure effective to maintain a major portion of said dioxane in said mixture in liquid form.

4. The method which comprises heating at a temperature of at least 170° C. a mixture of one molar proportion of a fatty material consisting predominantly of triglyceride, substantially more than one molar proportion of glycerine, dioxane in an amount less than the combined weight of said fatty material and said glycerine but at least equal to 5% of said combined weight, and a basic metal soap catalyst, maintaining said mixture, during said heating, under pressure effective to maintain a major portion of said dioxane in said mixture in liquid form, and thereafter and while said mixture is heated flashing off said dioxane by reducing said pressure to atmospheric pressure.

5. The method which comprises reacting a vegetable oil with glycerine in a reaction mixture containing dioxane in an amount of at least 5% of the combined weight of said vegetable oil and said glycerine but less than said combined weight, and a basic alcoholysis catalyst selected from the group consisting of alkali and alkaline earth metal soaps, said reacting being effected by heating said reaction mixture at a temperature of about 250° C. while maintaining said reaction mixture under pressure effective to maintain a substantial proportion of said dioxane in said reaction mixture in liquid form, and thereafter separating dioxane and unreacted glycerine from the resulting reaction product.

6. The method which comprises reacting a fatty material consisting predominantly of triglyceride with an excess of glycerine in a reaction mixture containing 5–50% by weight of dioxane based on the combined weight of said fatty material and said glycerine, and a basic metal soap catalyst, said reacting being effected by heating said reaction mixture at a temperature of at least 170° C. and, during said heating, maintainning said reaction mixture under pressure effective to maintain a substantial proportion of said dioxane in said reaction mixture in liquid form.

7. The method which comprises heating at a temperature of about 250° C. a mixture of one molar proportion of vegetable oil calculated as triglyceride, substantially more than one molar proportion of glycerine, dioxane in an amount of 5–50% by weight based on the combined weight of said vegetable oil and said glycerine, and a basic metal soap catalyst, maintaining said mixture under pressure effective to prevent substantial vaporization of said dioxane from said mixture during said heating, and thereafter separating said dioxane and unreacted glycerine from the resulting reaction product.

8. The method of making monoglycerides in high yield which comprises heating at a temperature of about 250° C. a mixture of one molar proportion of triglyceride, substantially more than one mole of glycerine, dioxane in an amount of 5–50% by weight based on the combined weight of said triglyceride and said glycerine, and a basic metal soap catalyst selected from the group consisting of alkali metal soaps and alkaline earth metal soaps, maintaining said mixture under pressure effective to prevent substantial vaporization of said dioxane from said mixture during said heating, thereafter reducing said pressure to atmospheric pressure while said mixture is heated and thereby flashing off said dioxane, and separating unreacted glycerine from the resulting product.

9. The method which comprises reacting a fatty material with glycerine in the presence of a basic metal soap catalyst and at a temperature of at least 170° C., and, during said reacting, removing water from the reaction mixture, adding to the reaction mixture additional glycerine and dioxane in an amount less than the total weight of fatty material and glycerine but greater than 5% of said total weight, heating the resulting mixture to a temperature of at least 170° C., and, during said heating, maintaining said resulting mixture at a pressure effective to maintain a substantial proportion of said dioxane in said resulting mixture in liquid form during said heating.

10. In the preparation of monoesters by reacting a fatty material with a polyhydric alcohol in the presence of a catalyst, the process utilizing commercial polyhydric alcohol containing a minor amount of water which comprises reacting an excess of such commercial polyhydric alcohol and said fatty material in a reaction mixture with a basic metal soap catalyst and in the presence of dioxane, said dioxane amounting to at least 5% by weight but less than the combined weight of said fatty material and said alcohol, the reacting being effected at a temperature of at least 170° C. and at a pressure sufficient to maintain a substantial proportion of said dioxane in liquid form at the reaction temperature.

11. In the preparation of monoesters by reacting a fatty material with glycerine in the presence of a catalyst, the process utilizing commercial glycerine containing a minor amount of water which comprises reacting an excess of said glycerine and said fatty material in a reaction mixture with a basic metal soap catalyst and in the presence of dioxane, said dioxane amounting to at least 5% by weight but less than the combined weight of said fatty material and said glycerine, the reacting being effected at a temperature of at least 170° C. and at a pressure sufficient to maintain a substantial proportion of said dioxane in liquid form at the reaction temperature.

References Cited in the file of this patent

UNITED STATES PATENTS 2,251,693  Richardson et al. _____ Aug. 5, 1941

FOREIGN PATENTS 412,766  Great Britain _____ 1934